United States Patent
Ebner et al.

(10) Patent No.: US 10,305,155 B2
(45) Date of Patent: May 28, 2019

(54) BATTERY PACK WITH PHASE CHANGE MATERIAL

(71) Applicant: Milwaukee Electric Tool Corporation, Brookfield, WI (US)

(72) Inventors: Jeremy R. Ebner, Milwaukee, WI (US); Cameron R. Schulz, Milwaukee, WI (US); Troy C. Thorson, Cedarburg, WI (US); Todd M. Gehring, Hartland, WI (US); Michael Kolden, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 118 days.

(21) Appl. No.: 15/667,402

(22) Filed: Aug. 2, 2017

(65) Prior Publication Data

US 2017/0331163 A1    Nov. 16, 2017

Related U.S. Application Data

(63) Continuation of application No. 14/823,587, filed on Aug. 11, 2015, now Pat. No. 9,742,047.

(60) Provisional application No. 62/035,890, filed on Aug. 11, 2014.

(51) Int. Cl.
| | |
|---|---|
| *H01M 4/02* | (2006.01) |
| *H01M 10/659* | (2014.01) |
| *H01M 2/10* | (2006.01) |
| *H01M 2/12* | (2006.01) |

(52) U.S. Cl.
CPC ......... *H01M 10/659* (2015.04); *H01M 2/105* (2013.01); *H01M 2/1223* (2013.01)

(58) Field of Classification Search
CPC ...................................................... H01M 4/02
See application file for complete search history.

(56) References Cited

U.S. PATENT DOCUMENTS

| | | |
|---|---|---|
| 4,329,407 A | 5/1982 | Gross et al. |
| 5,343,368 A | 8/1994 | Miller |
| 5,449,571 A | 9/1995 | Longardner et al. |
| 6,596,433 B2 | 7/2003 | Gudmundsson et al. |
| 6,797,427 B2 | 9/2004 | Maleki et al. |
| 7,157,882 B2 | 1/2007 | Johnson et al. |
| 7,157,883 B2 | 1/2007 | Johnson et al. |
| 7,164,257 B2 | 1/2007 | Johnson et al. |
| 7,205,067 B2 | 4/2007 | Godevais et al. |
| 7,270,910 B2 | 9/2007 | Yahnker et al. |
| 7,342,381 B2 | 3/2008 | Johnson et al. |
| 7,352,578 B2 | 4/2008 | Willets et al. |
| 7,492,124 B2 | 2/2009 | Johnson et al. |
| 7,504,804 B2 | 3/2009 | Johnson et al. |
| 7,589,500 B2 | 9/2009 | Johnson et al. |

(Continued)

FOREIGN PATENT DOCUMENTS

| | | |
|---|---|---|
| EP | 1879253 | 1/2008 |
| WO | WO 2004/019065 | 3/2004 |

(Continued)

*Primary Examiner* — Jacob B Marks
(74) *Attorney, Agent, or Firm* — Michael Best & Friedrich LLP

(57) ABSTRACT

A bladder configured to support a phase change material in a heat transfer relationship with at least one battery cell including a wall defining a channel, the phase change material surrounding a portion of the channel.

20 Claims, 9 Drawing Sheets

(56) References Cited

U.S. PATENT DOCUMENTS

| | | |
|---|---|---|
| 7,667,437 B2 | 2/2010 | Johnson et al. |
| 7,791,318 B2 | 9/2010 | Johnson et al. |
| 7,931,979 B2 | 4/2011 | Choi et al. |
| 7,944,181 B2 | 5/2011 | Johnson et al. |
| 7,952,326 B2 | 5/2011 | Johnson et al. |
| 8,080,326 B2 | 12/2011 | Chan et al. |
| 8,101,293 B2 | 1/2012 | Chan et al. |
| 8,109,324 B2 | 2/2012 | Farid et al. |
| 8,343,647 B2 | 1/2013 | Ahn et al. |
| 8,436,584 B2 | 5/2013 | Johnson et al. |
| 8,471,532 B2 | 6/2013 | Johnson et al. |
| 8,518,574 B1 | 8/2013 | Kwak et al. |
| 8,623,538 B2 | 1/2014 | Wang |
| 8,649,140 B2 | 2/2014 | Peterson et al. |
| 8,653,790 B2 | 2/2014 | Johnson et al. |
| 8,715,875 B2 | 5/2014 | Chan et al. |
| 8,758,925 B2 | 6/2014 | Choi et al. |
| 8,802,266 B2 | 8/2014 | Chan et al. |
| 8,822,067 B2 | 9/2014 | Johnson et al. |
| 8,835,035 B2 | 9/2014 | Kim |
| 8,927,131 B2 | 1/2015 | Wang |
| 8,936,864 B2 | 1/2015 | Yang et al. |
| 8,963,497 B2 | 2/2015 | Yang et al. |
| 2004/0156327 A1 | 8/2004 | Yankielun et al. |
| 2005/0007068 A1 | 1/2005 | Johnson et al. |
| 2005/0202310 A1 | 9/2005 | Yahnker et al. |
| 2005/0258801 A9 | 11/2005 | Johnson et al. |
| 2006/0091858 A1 | 5/2006 | Johnson et al. |
| 2006/0103357 A1 | 5/2006 | Johnson et al. |
| 2006/0108984 A1 | 5/2006 | Johnson et al. |
| 2007/0103116 A1 | 5/2007 | Johnson et al. |
| 2007/0103121 A1 | 5/2007 | Johnson et al. |
| 2007/0108942 A1 | 5/2007 | Johnson et al. |
| 2007/0128505 A9 | 6/2007 | Yahnker et al. |
| 2008/0003491 A1 | 1/2008 | Yahnker et al. |
| 2009/0169983 A1 | 7/2009 | Kumar et al. |
| 2009/0195216 A1 | 8/2009 | Johnson et al. |
| 2009/0197152 A1 | 8/2009 | Johnson et al. |
| 2010/0028758 A1 | 2/2010 | Eaves et al. |
| 2010/0148729 A1 | 6/2010 | Johnson et al. |
| 2010/0151308 A1 | 6/2010 | Hermann et al. |
| 2010/0167110 A1 | 7/2010 | Johnson et al. |
| 2010/0304256 A1 | 12/2010 | Chan et al. |
| 2010/0304257 A1 | 12/2010 | Chan et al. |
| 2010/0316821 A1 | 12/2010 | Chang et al. |
| 2010/0327815 A1 | 12/2010 | Johnson et al. |
| 2011/0070474 A1 | 3/2011 | Lee et al. |
| 2011/0189525 A1 | 8/2011 | Palanchon et al. |
| 2011/0215767 A1 | 9/2011 | Johnson et al. |
| 2011/0244294 A1 | 10/2011 | Han et al. |
| 2011/0262793 A1 | 10/2011 | Reis et al. |
| 2011/0293986 A1 | 12/2011 | Kozu |
| 2011/0305935 A1 | 12/2011 | Yoon |
| 2012/0003523 A1 | 1/2012 | Schaller et al. |
| 2012/0107662 A1 | 5/2012 | Römmler et al. |
| 2012/0224289 A1 | 9/2012 | Peterson et al. |
| 2012/0227994 A1 | 9/2012 | Yang et al. |
| 2012/0251848 A1 | 10/2012 | Cho |
| 2012/0263980 A1 | 10/2012 | Soukhojak et al. |
| 2012/0280643 A1 | 11/2012 | Roehm |
| 2013/0084487 A1 | 4/2013 | Kwak et al. |
| 2013/0115506 A1 | 5/2013 | Wayne et al. |
| 2013/0171492 A1 | 7/2013 | Shih et al. |
| 2013/0193891 A1 | 8/2013 | Wood et al. |
| 2013/0202939 A1* | 8/2013 | Kwak ................ 429/120 |
| 2013/0224527 A1 | 8/2013 | Johnson et al. |
| 2013/0224528 A1 | 8/2013 | Johnson et al. |
| 2013/0236745 A1 | 9/2013 | Norton |
| 2013/0241499 A1 | 9/2013 | Johnson et al. |
| 2013/0244070 A1 | 9/2013 | Johnson et al. |
| 2013/0270476 A1 | 10/2013 | Yang et al. |
| 2014/0004394 A1 | 1/2014 | Kerkamm |
| 2014/0017118 A1 | 1/2014 | Stoddard et al. |
| 2014/0079978 A1 | 3/2014 | Al-Hallaj et al. |
| 2014/0106198 A1 | 4/2014 | Guha et al. |
| 2014/0120399 A1 | 5/2014 | Balandin |
| 2014/0159507 A1 | 6/2014 | Johnson et al. |
| 2014/0173300 A1 | 6/2014 | Yamazaki et al. |
| 2014/0370354 A1 | 12/2014 | Yang et al. |
| 2014/0377621 A1 | 12/2014 | Hanyu et al. |
| 2015/0015426 A1 | 1/2015 | Lindahl et al. |

FOREIGN PATENT DOCUMENTS

| | | |
|---|---|---|
| WO | WO 2005/086851 | 9/2005 |
| WO | WO 2005/117232 | 12/2005 |
| WO | WO 2007/120167 | 10/2007 |
| WO | WO 2008/145455 | 12/2008 |
| WO | WO 2009/141348 | 11/2009 |
| WO | WO 2010/099355 | 9/2010 |
| WO | WO 2011/117221 | 9/2011 |
| WO | WO 2012/139338 | 10/2012 |
| WO | WO 2012/167470 | 12/2012 |
| WO | WO 2013/017490 | 2/2013 |
| WO | WO 2013/051302 | 4/2013 |
| WO | WO 2013/112469 | 8/2013 |
| WO | WO 2013/131965 | 9/2013 |
| WO | WO 2014/079507 | 5/2014 |
| WO | WO 2014/130676 | 8/2014 |
| WO | WO 2014/154883 | 10/2014 |

* cited by examiner

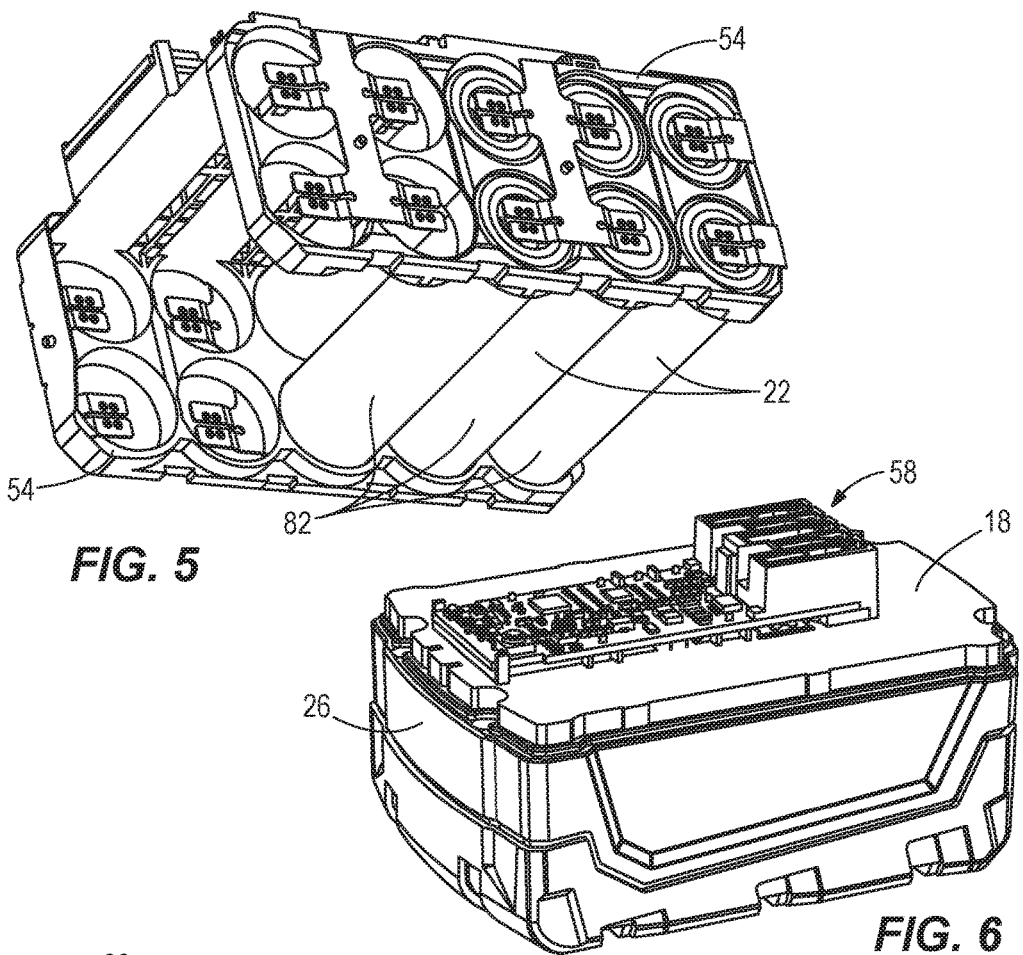
FIG. 5
FIG. 6
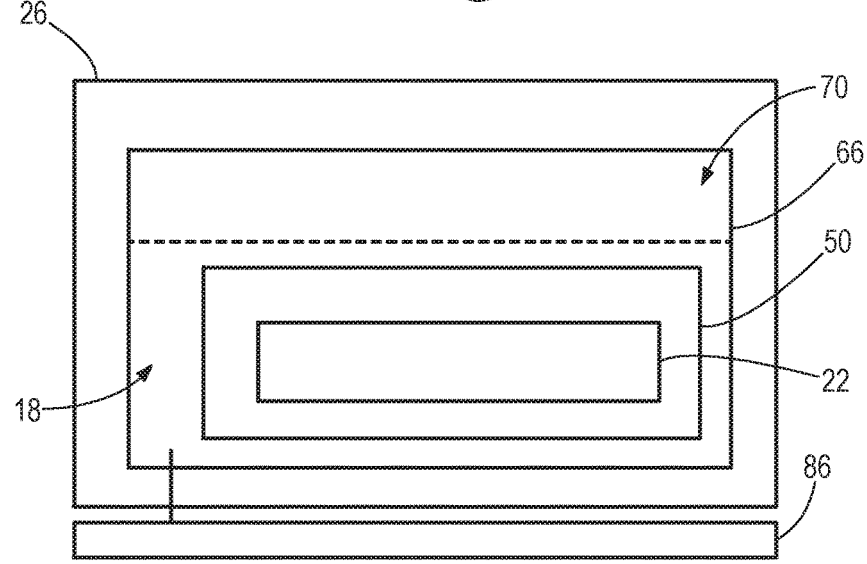
FIG. 7

BATTERY PACK WITH PHASE CHANGE MATERIAL

CROSS-REFERENCE TO RELATED APPLICATION

This application is a continuation application of U.S. patent application Ser. No. 14/823,587, filed on Aug. 11, 2015, which claims priority to U.S. Provisional Patent Application No. 62/035,890, filed on Aug. 11, 2014, the entire contents of each application is hereby incorporated by reference in its entirety.

FIELD

The present invention relates to battery packs and, more specifically, to a battery pack with phase change material.

SUMMARY

A battery may include one or more battery cells, and each battery cell generally includes a positive electrode, a negative electrode, a separator provided to prevent a short circuit between the electrodes, and an outer jacket or cover. An electrolyte facilitates the transfer of electrical charge between the electrodes. The material(s) used for the electrodes or electrolyte depend upon the chemistry of the battery.

A plurality of battery cells may be configured together into a battery pack. The battery pack may be portable and rechargeable, and such battery packs may be used to power tools or electrical devices.

During operation, as a battery pack discharges and provides power to a tool or electrical device, or charges/recharges when connected to a power source, the battery cells generate heat. The heat leads to an increase in battery cell temperature. During normal battery pack operation, the battery cell temperature does not adversely affect the battery cells or battery pack. However, in certain operational circumstances, such as long duration and/or high amperage discharges (e.g., 40 A or more), the battery cells may generate excessive heat, excessively raising the temperature of the battery cells. Exposure to high temperature is a cause of cell damage and degradation, shortening the operation life of the battery cells and the battery pack.

The battery pack may include temperature management components to address high temperature conditions. For example, the battery pack may include a thermocouple that monitors the temperature of the battery cells and, to minimize damage to each battery cell in high temperature conditions, electronically disables any cell exceeding a maximum temperature threshold. The battery pack typically remains disabled until the cells cool and the temperature drops below a pre-determined threshold.

Unfortunately, when battery cells are disabled due to high temperature conditions, the battery pack is unable to provide power to the associated tool or electrical device. Accordingly, the user is unable to continue use of the tool or electrical device when faced with a disabled battery pack.

Further, while temperature management components attempt to minimize potential damage to the battery cells caused by high temperature conditions, damage may still occur, resulting in shortened operational life of the battery cells and the battery pack. In addition, high temperature conditions typically result in battery cells being disabled before complete discharge of energy stored in the battery cells (a.k.a. "end of discharge"). Thus, a user is likely to have a disabled battery pack before completing use of the tool or electrical device.

In one independent aspect, a battery pack may generally include a housing; at least one battery cell supported in the housing, the cell including an outer jacket, an opening being defined through the jacket; and phase change material within the housing and at least partially encapsulating the cell, the phase change material contacting the cell through the opening.

The battery pack may include a plurality of battery cells, each cell including an outer jacket, an opening being defined through the jacket of each cell, and the phase change material may contact each cell through the associated opening. The jacket may be formed of plastic. The battery pack may include a heat sink in heat transfer relationship with the phase change material, the heat sink extending to an exterior of the housing.

The battery pack may include a sealed chamber supported in the housing, the phase change material being contained in the chamber. The cell may be contained in the sealed chamber. The phase change material may include a solid-liquid phase change material, the phase change material having a different volume in a solid state than in a liquid state. The chamber may define an interior volume greater than a volume of the phase change material in the solid state and in the liquid state. The chamber may include a flexible wall accommodating a change in volume of the phase change material between the solid state and the liquid state.

The phase change material may include paraffin wax and a microcrystalline phase change material compound. The battery pack may include a temperature regulation system operable to measure a temperature of the cell and to disable the cell if the measured temperature exceeds a predetermined temperature. The phase change material may change phases before the measured temperature exceeds the predetermined temperature.

In another independent aspect, a battery pack may generally include a housing; at least one battery cell supported in the housing; phase change material within the housing and at least partially encapsulating the cell, the phase change material in heat transfer relationship with the cell; and a heat sink in heat transfer relationship with the phase change material, the heat sink extending to an exterior of the housing.

In yet another independent aspect, a battery pack may generally include a housing; at least one battery cell supported in the housing; phase change material within the housing and at least partially encapsulating the cell; and a sealed chamber supported in the housing, the phase change material being contained in the chamber.

In a further independent aspect, a battery pack may generally include a housing; at least one battery cell supported in the housing; and phase change material within the housing and at least partially encapsulating the cell, the phase change material including paraffin wax and a microcrystalline phase change material compound.

In another independent aspect, a battery pack may generally include a housing; at least one battery cell supported in the housing; a phase change material; and a bladder containing the phase change material, the bladder defining a channel having an opening, the bladder being in a heat transfer relationship with the at least one battery cell.

In yet another independent aspect, a battery pack may generally include a housing; a phase change material; a bladder containing the phase change material and defining a channel, the phase change material surrounding a portion of the channel; and a plurality of battery cells evenly positioned about and in a heat transfer relationship with the bladder.

In a further independent aspect, a battery pack may generally include a housing; a phase change material; at least one bladder containing the phase change material; and a plurality of battery cells evenly positioned about, equidistant from and in a heat transfer relationship with the at least one bladder.

Other independent features and independent aspects of the invention will become apparent by consideration of the following detailed description, claims and accompanying drawings.

BRIEF DESCRIPTION OF THE DRAWINGS

FIG. 5 is an isometric view of the battery pack of FIG. 2 with a portion of the cell support and a number of battery cells removed to illustrate the cell receptacles retaining the battery cells.

FIG. 6 is an isometric view of the battery pack of FIG. 1 with a portion of the housing removed to illustrate the circuit board and phase change material encapsulating a portion of the cell support and the battery cells.

FIG. 7 is a schematic side view diagram of the battery pack of FIG. 1 illustrating phase change material provided in a sealed container and having a heat sink to facilitate heat dissipation.

DETAILED DESCRIPTION

Figure 1:
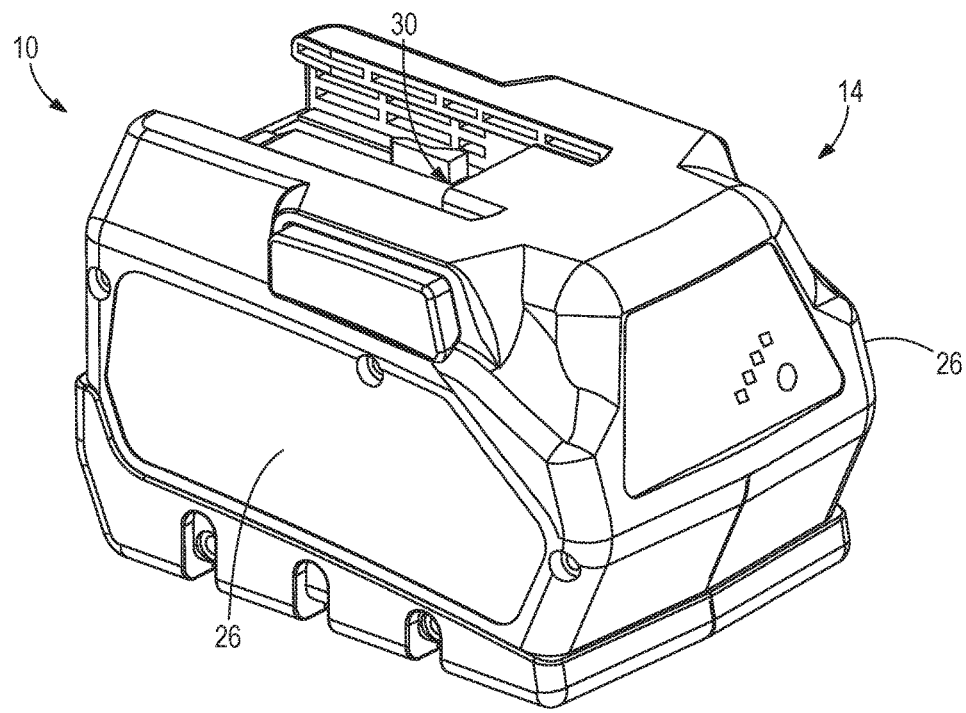
FIG. 1 is an isometric view of a battery pack.

Before any independent embodiments of the present invention are explained in detail, it should be understood that the invention is not limited in its application to the details or construction and the arrangement of components as set forth in the following description or as illustrated in the drawings. The invention is capable of other independent embodiments and of being practiced or of being carried out in various ways.

It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

FIGS. 1-7 illustrate a battery system 10 including a battery pack 14 with a temperature regulation system. The temperature regulation system generally includes phase change material 18 incorporated into the battery pack 14. FIGS. 8-20 illustrate the battery system 10 including the battery pack 14 with a temperature regulation system and with a system operable to, for example, contain phase change material 18, managing material volume during changes in phase of the phase change material 18, etc.

The phase change material 18 generally has a heat of fusion sufficient to absorb excess heat generated by battery cells 22, which may delay high temperature conditions in the battery pack 14. This may, for example, lengthen the operational life of battery cells 22 and the battery pack 14, by minimizing exposure to high temperature conditions and potential damage to or degradation of the cells 22, while allowing the battery pack 14 to power the tool or electrical device until the battery cells 22 are substantially completely discharged (a.k.a., "end of discharge"), rather than being disabled prior to complete discharge.

For ease of discussion and understanding, the following description will refer to a tool and/or electrical device as an "electrical device". The electrical device may be any device that receives power from or provides power to a battery pack 14. For example, the electrical device may include, but is not limited to, a drill, saw, impact driver, impact wrench, grinder, grease gun, light, radio, vacuum, outdoor tool, charger, or any other suitable device that draws, requires, or provides power during operation.

FIG. 1 illustrates an example of a battery system 10. The battery system 10 may include a battery pack 14 and, for rechargeable battery packs, a charger (not shown). The battery pack 14 includes a battery housing 26 formed of an impact resistant material and defining a terminal support 30 for one or more battery terminals (not shown). The terminal support 30 provides removable engagement of the battery pack 14 and the battery terminal(s) with the electrical device. It should be appreciated that the battery pack 14 shown in FIG. 1 is for the purposes of illustration. In other constructions, the battery pack 14 may have any shape, size, or dimensions suitable to engage and provide power to the appropriate electrical device.

Figure 2:
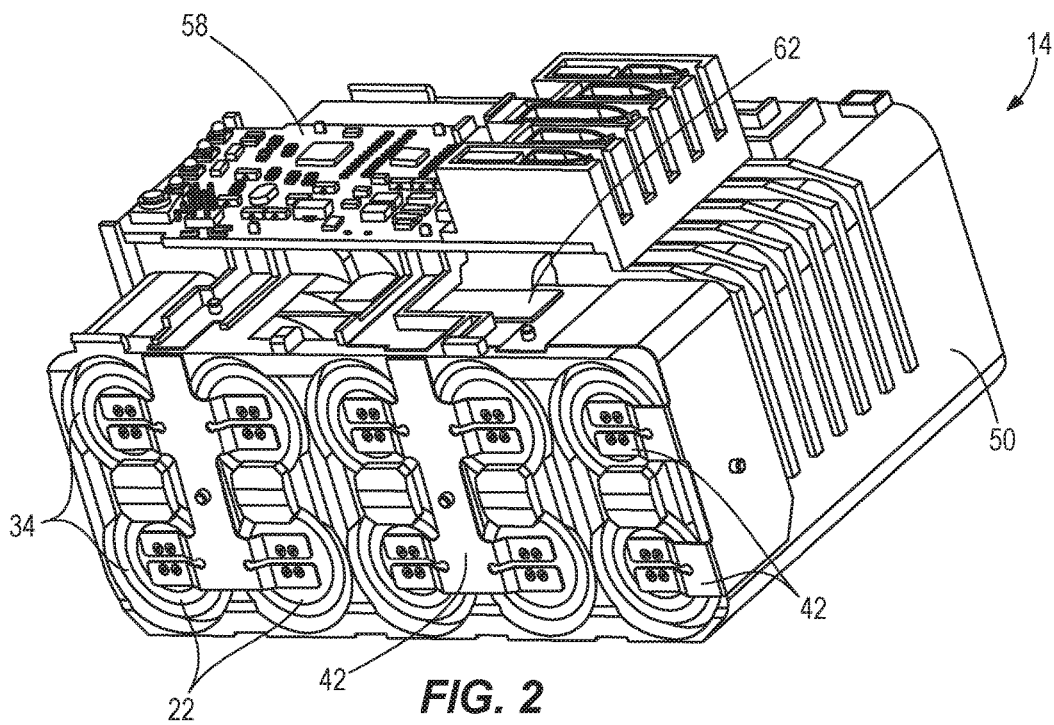
FIG. 2 is an isometric view of the battery pack of FIG. 1 with the housing and phase change material removed to illustrate the battery cells and associated components.
Figure 3:
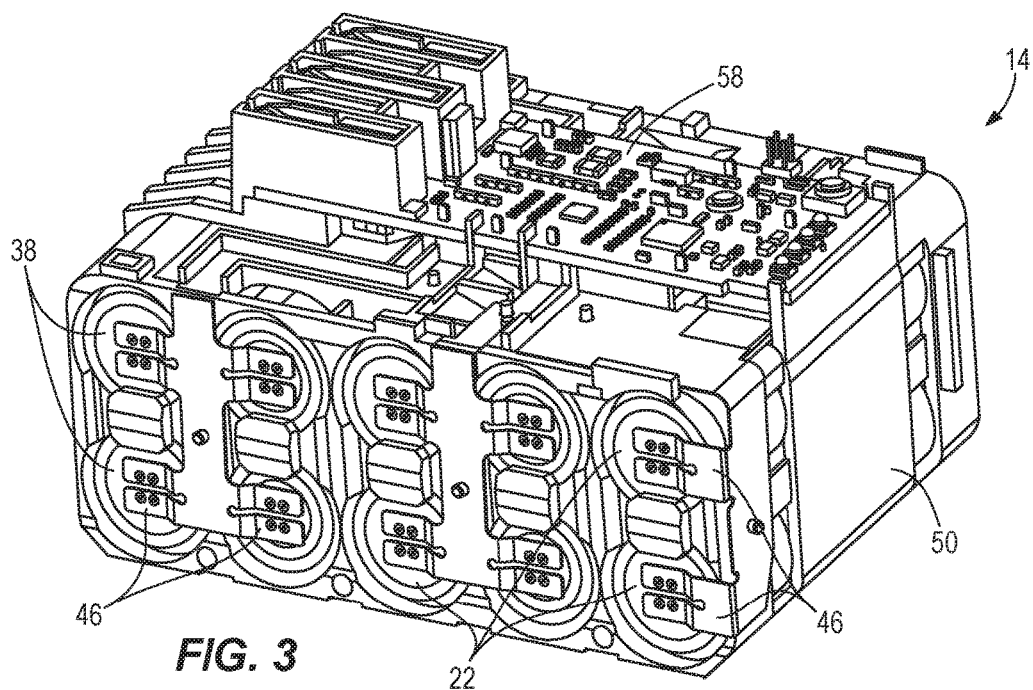
FIG. 3 is an isometric view of the battery pack of FIG. 2, illustrating the opposite side.
Figure 4:
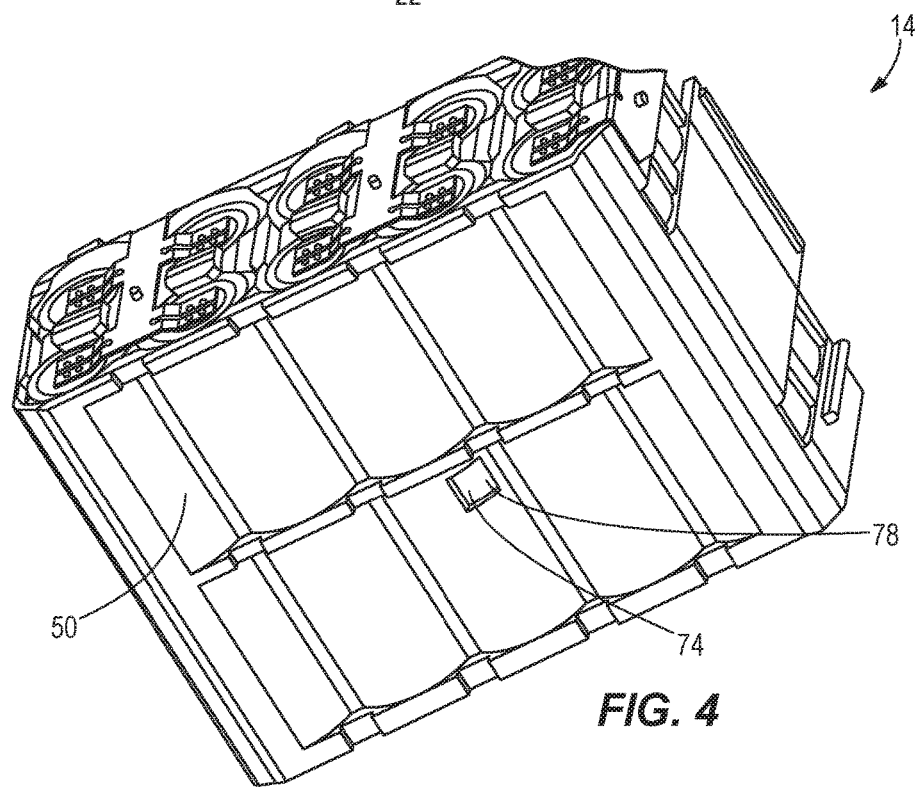
FIG. 4 is an isometric view of the bottom of the battery pack of FIG. 2.

FIGS. 2-4 illustrate the battery pack 14 with the battery housing 26 removed. The battery pack 14 includes a plurality of cells 22 having any suitable battery chemistry, including, but not limited to, lead-acid, Nickel-Cadmium ("NiCd"), Nickel-Metal Hydride ("NiMH"), Lithium ("Li"), Lithium-ion ("Li-ion"), any other suitable Lithium-based chemistry, or any suitable rechargeable or non-rechargeable battery chemistry.

Each cell 22 includes a positive terminal 34 (FIG. 2) and a negative terminal 38 (FIG. 3) provided on opposite ends of each cell 22. However, in other embodiments (not shown), the cells 22 may have a different arrangement (e.g., with the terminals 34, 38 on the same side of the cell 22).

The cells 22 may be electrically connected by battery straps or tabs 42, 46. Referring to FIGS. 2-4, the battery straps 42, 46 electrically interconnect the cells 22, with the positive terminals 34 electrically connected to each other by positive battery straps 42 (see FIG. 2), and the negative terminals 38 electrically connected to each other by negative battery straps 46 (see FIG. 3). In the illustrated construction, the cells 22 are connected in a series-parallel arrangement. In other embodiments (not shown), the cells 22 may be electrically connected in series, with a positive terminal 34 of one cell 22 being electrically connected to a negative terminal 38 of another cell 22, in parallel or in a different series-parallel arrangement.

The battery pack 14 may be any suitable or desired nominal voltage or nominal amperage. The cell chemistry, cell number, cell size, electrical connection of cells 22, etc. may be determined based upon the desired voltage, amperage, or end use of the battery pack 14. While the illustrated battery pack 14 has ten cells 22, in other constructions (not shown), the battery pack 14 may include more than or fewer than ten cells 22.

The cells 22 are arranged and housed in a cell support 50. The cell support 50 includes opposing cell receptacles 54 (see FIG. 5) to receive and retain the plurality of cells 22 within the cell support 50. The cell support 50 also carries a circuit 58 (FIGS. 2-3) electrically connected to the cells 22. The circuit 58 may be a printed circuit board 58 in communication with one or more components to enhance performance of the battery pack 14. For example, the circuit board 58 may include, or be in communication with voltage detection, battery characteristic monitoring, temperature measurement, temperature regulation, microprocessor components, etc.

Referring to FIG. 2, a thermocouple 62 (e.g., a thermistor, thermostat, etc.) is electrically coupled to the circuit board 58. The thermocouple 62 measures the temperature of the cells 22 and may communicate the measurement to components of the circuit board 58, including the microprocessor. The measurement may be stored in associated memory or may trigger one or more programs or instructions associated with the circuit board 58.

For example, a temperature measurement determined by the microprocessor to be above a predetermined threshold (i.e., a maximum or high temperature threshold (e.g., 60° C. to 80° C. for a lithium-based chemistry)) may trigger execution of instructions by the microprocessor (or one or more other components) associated with the temperature regulation system to disable the battery pack 14 or one or more cells 22. In such constructions, the battery pack 14 may be disabled until the temperature drops below a predetermined threshold that allows for operation of the battery pack 14 while minimizing or preventing damage to or degradation of the cells 22.

Features of the battery pack 14, the battery cells 22, the circuit board 58, the temperature regulation system, etc. may be similar to the structure described and illustrated in U.S. Pat. No. 7,157,882, issued Jan. 2, 2007, and in U.S. Pat. No. 7,589,500, issued Sep. 15, 2009, the entire contents of which are hereby incorporated by reference.

FIG. 6 illustrates one construction of the battery pack 14 including phase change material 18. In the illustrated construction, the phase change material 18 includes a solid-liquid phase change material. The illustrated phase change material 18 changes density and volume (e.g., contracts) during the solid-liquid phase change. While the phase change material 18 may include a single phase change compound, in the illustrated construction, the phase change material 18 is a mixture of several compounds.

Due to the contraction of certain phase change materials 18 during a change in phase (e.g., during the solid-liquid phase change of paraffin wax), air gaps can form in the battery pack 14 between the battery cells 22 and other heat-generating components and the phase change material 18. Air gaps typically have a high thermal resistance, causing a delay in heat transfer to the phase change material 18.

To minimize the creation of air gaps, a microcrystalline phase change compound can be added. The compound improves adhesion of the phase change material 18 with the battery cells 22 and other heat-generating components. The improved adhesion reduces the likelihood of the phase change material 18 disconnecting from the battery cells 22 and other heat-generating components, thereby maximizing heat transfer to the phase change material 18. Accordingly, the phase change material 18 can include paraffin wax, alone or in combination with a microcrystalline phase change compound, and/or additional compounds.

The phase change material 18 has a heat of fusion sufficient to absorb heat generated by the battery pack 14 during power transfer (e.g., discharge, charging of the cells 22), to maintain the temperature at or below the predetermined temperature threshold to inhibit pack shutoff before end of discharge. This may, for example, limit situations in which the temperature regulation system disables one or more battery cells 22 due to excess temperature conditions.

The phase change material 18 can encapsulate at least a portion of the cell support 50 and/or of the associated cell receptacles 54 and, as such, can encapsulate at least a portion of the battery cells 22. In the illustrated construction, the phase change material 18 completely encapsulates the battery cells 22. The phase change material 18 can also encapsulate the battery straps 46. As shown in FIG. 6, the phase change material 18 is generally provided around and between the battery cells 22, around the cell support 50 and between the cell support 50 and the housing 26.

In other constructions (not shown), the phase change material 18 only partially encapsulate the cell(s) 22, the cell support 50, etc. In other constructions (not shown), the phase change material 18 may encapsulate or partially encapsulate other components of the battery pack 14 (e.g., the circuit board 58, the terminal block, etc.).

FIG. 7 illustrates another construction of the battery pack 14 including phase change material 18. In this construction, the phase change material 18 is provided in a sealed chamber or container 66 to, for example, reduce the likelihood of leakage of the phase change material 18 from the battery pack 14. The container 66 also houses the battery cells 22 and cell support 50 and may also house the printed circuit board 58, other components of the battery pack 14.

The container 66 is constructed to position the phase change material 18 in relation to the battery cells 22 such that the phase change material 18 will effectively absorb heat generated by the battery cells 22 after repeated phase changes. The construction of the container 66 minimizes the likelihood of the phase change material 18, when it changes the liquid to solid phase, being in a location with poor heat transfer from the battery cells 22 to the phase change material 18 during the next heating cycle of the cells 22.

The container 66 is constructed to account for volumetric changes in the phase change material 18 during changes in phase (e.g., by providing an air gap, elastic substrate 70, etc.). This construction may, for example, allow the phase change material 18 to expand or contract during phase changes, protect components of the battery pack 14 from potential damage during phase changes, position the phase change material 18 in a location to maximize heat transfer from the battery cells 22 to the phase change material 18, etc.

In this construction the cell support 50 may include an aperture 74, and one or more battery cells 22 may include an aperture 78 provided through at least a portion of an outer sleeve or jacket 82 of the battery cell 22 (illustrated in FIG. 5). The apertures 74, 78 can improve the heat transfer rate from the battery cell(s) 22 to the phase change material 18 by reducing thermal resistance caused by the sleeve 82. In other constructions, a plurality of apertures 78 may be provided through each cell sleeve 82 or the sleeve 82 may be completely removed from the cell(s) 22.

Referring back to FIG. 7, the battery pack 14 may also include a heat sink 86 that extends from the phase change material 18 through the housing 26 to the outside environment. The heat sink 86 provides a thermal pathway to dissipate heat stored in the phase change material 18 to the environment outside of the battery pack 14. This arrangement of the heat sink 86 may, for example, limit the opportunity for heat stored in the phase change material 18 to be transferred back to the battery cells 22 in situations in which the cells 22 cool at a faster rate than the phase change material 18.

FIGS. 8-12 illustrate another construction of the battery pack 14 including phase change material 18 with the battery housing 26 and circuit 58 removed. In this construction, the battery pack 14 incorporates a system operable to, for example, contain phase change material, manage material volume during changes in phase, etc.

Figure 8:
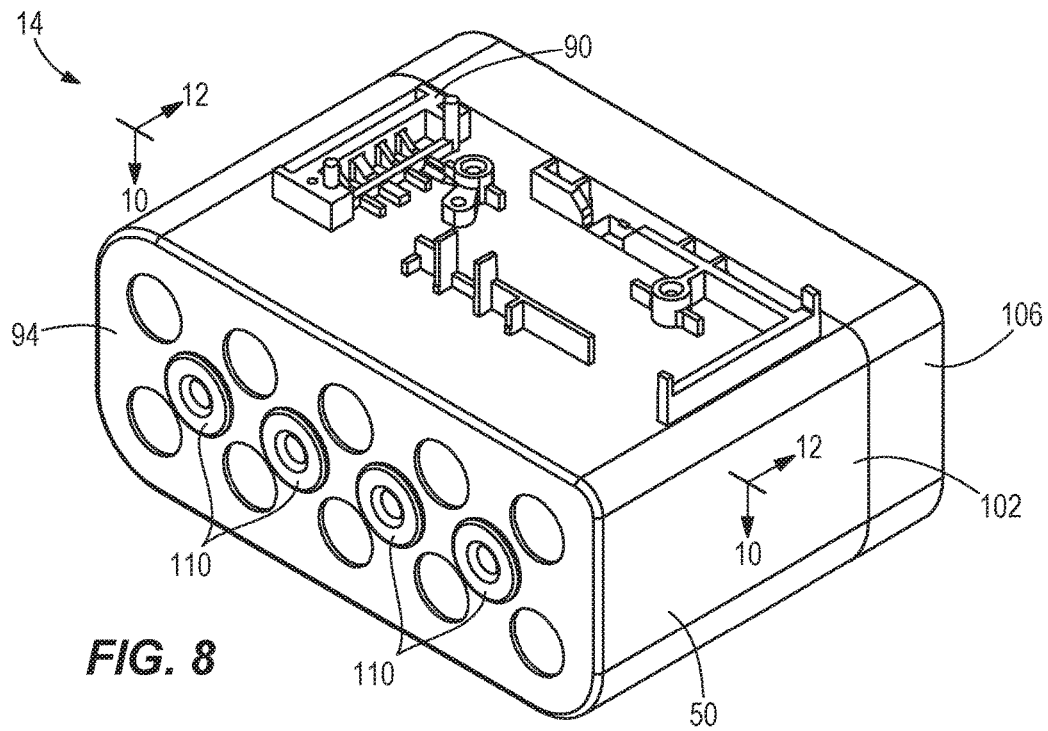
FIG. 8 is an isometric view of a construction of the battery pack of FIG. 1 with the battery housing and circuit removed to illustrate a system for managing material volume of phase change material during changes in phase.
Figure 9:
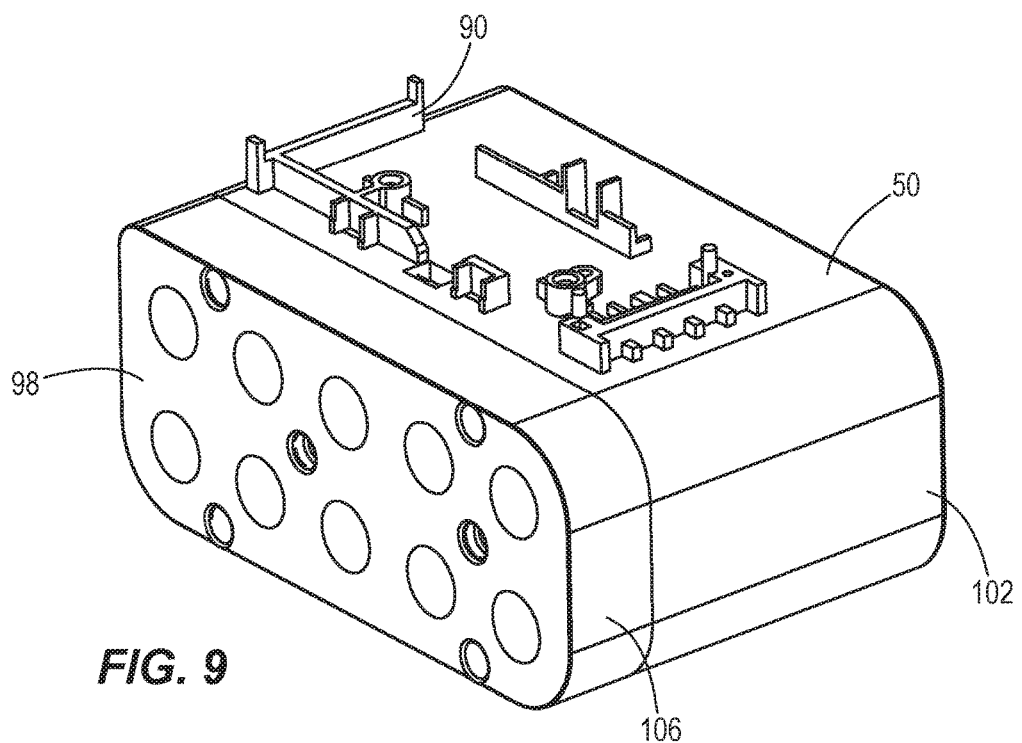
FIG. 9 is an isometric view of the battery pack of FIG. 8 from the opposite side.

Referring to FIGS. 8-9, the cell support 50 includes a circuit foundation 90 to facilitate attachment of the circuit 58 to the cell support 50. The cell support 50 also includes a first side wall 94 opposite a second side wall 98. The side walls 94, 98 are respectively coupled to or include the cell receptacles 54 (shown in FIG. 11). The first side wall 94 is defined by a first portion of a cell case 102, while the second side wall 98 is defined by a second portion of a cell case 106. The cell cases 102, 106 mate to define the cell support 50. For example, the cell cases 102, 106 can be keyed to couple and mate, forming a multi-piece cell support 50. In other constructions (not shown), the cell support 50 can be constructed from a single piece or another plurality of pieces.

Figure 10:
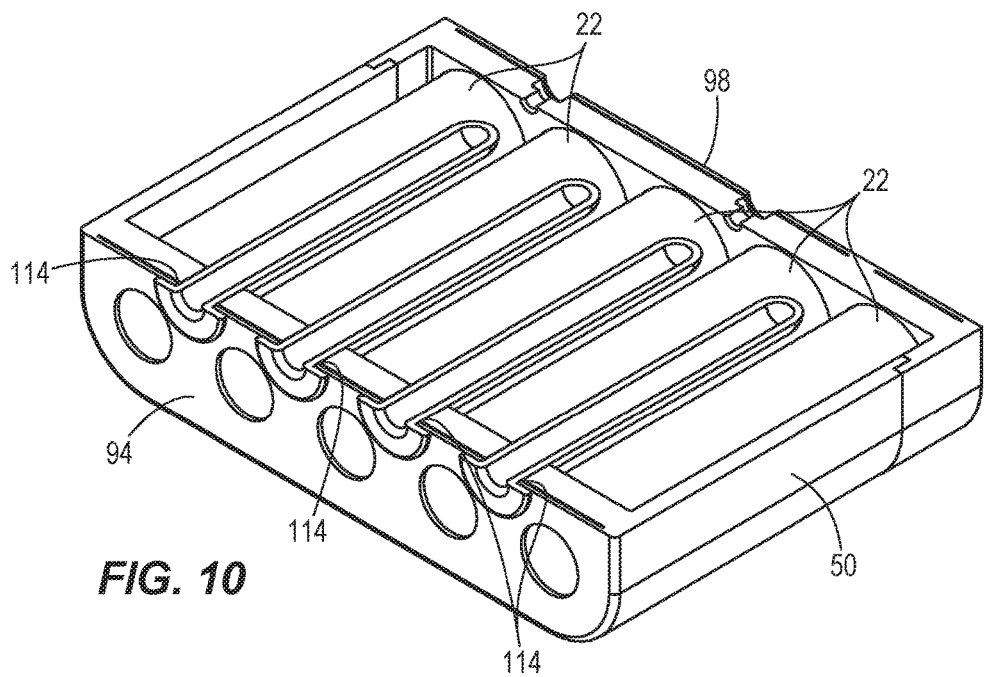
FIG. 10 is a cross-sectional view of the battery pack of FIG. 8, taken generally along line 10-10 in FIG. 8.

As illustrated in FIGS. 8 and 10, the first side wall 94 is configured to receive at least one bladder 110 and, more specifically, a plurality of (e.g., four) bladders 110. Each bladder 110 contains phase change material 18. The illustrated system includes positioning at least one bladder 110 in a heat transfer relationship with at least one cell 22 in the battery pack 14.

Figure 11:
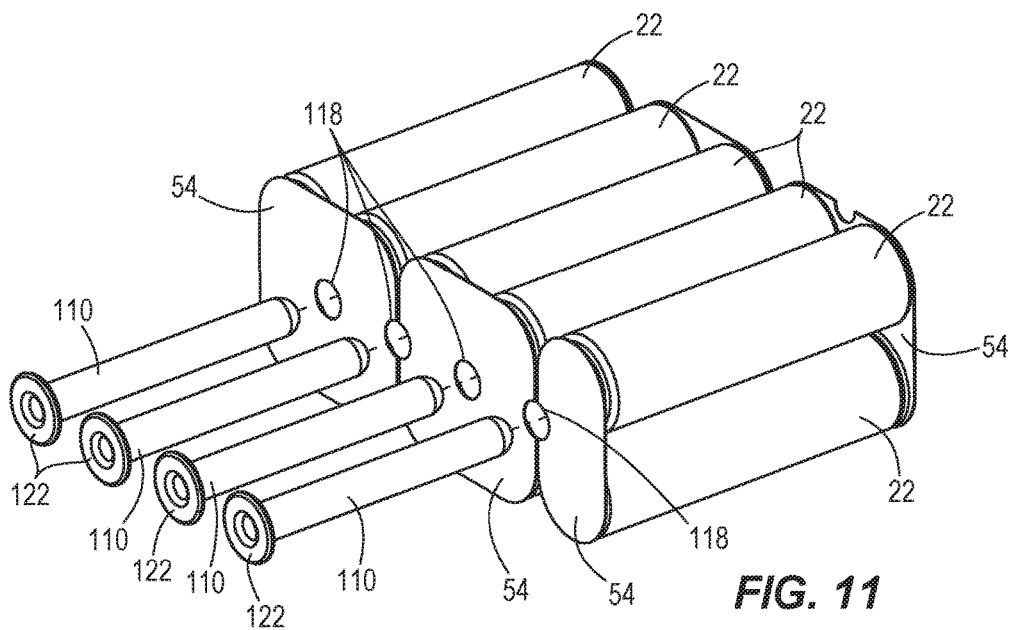
FIG. 11 is an isometric view of the battery pack of FIG. 8 with the cell support removed and the bladders partially exploded to illustrate the battery cells, cell receptacles, and apertures receiving the bladders.

Referring to FIGS. 10-11, each bladder 110 is received by a first aperture 114 in the first side wall 94 (shown in FIG. 10) and a second aperture 118 in (or defined by a portion of) the cell receptacles 54 (shown in FIG. 11). Once received, each bladder 110 extends from the first side wall 94 towards the second side wall 98 a distance into the cell support 50. The length of insertion of the bladder 110 can be defined by a length $L_1$ of bladder 110 (see FIG. 15).

While, in the illustrated construction, each bladder 110 extends into the cell support 50 a distance greater than half-way between the side walls 94, 98 (i.e., a majority of the distance between the side walls 94, 98), in other constructions (not shown), one or more bladder 110 can extend entirely through the cell support 50 to contact, engage or extend through the second side wall 98.

Each bladder 110 includes a flange 122 having a diameter $D_1$ that is greater than a diameter $D_2$ of the bladder 110. Referring back to FIGS. 10-11, each aperture 114, 118 has a diameter (not shown) complementary to the body of the bladder 110, but not to the flange 122. Stated otherwise, the apertures 114, 118 are of a suitable size to receive the body of the bladder 110 (e.g., the diameter of apertures 114, 118 are larger than $D_2$) but not to receive the respective flange 122 (e.g., the diameter of apertures 114, 118 are smaller than $D_1$). By having a diameter $D_1$ larger than the diameter of each aperture 114, 118, the flange 122 limits insertion of the bladder 110.

Figure 12:
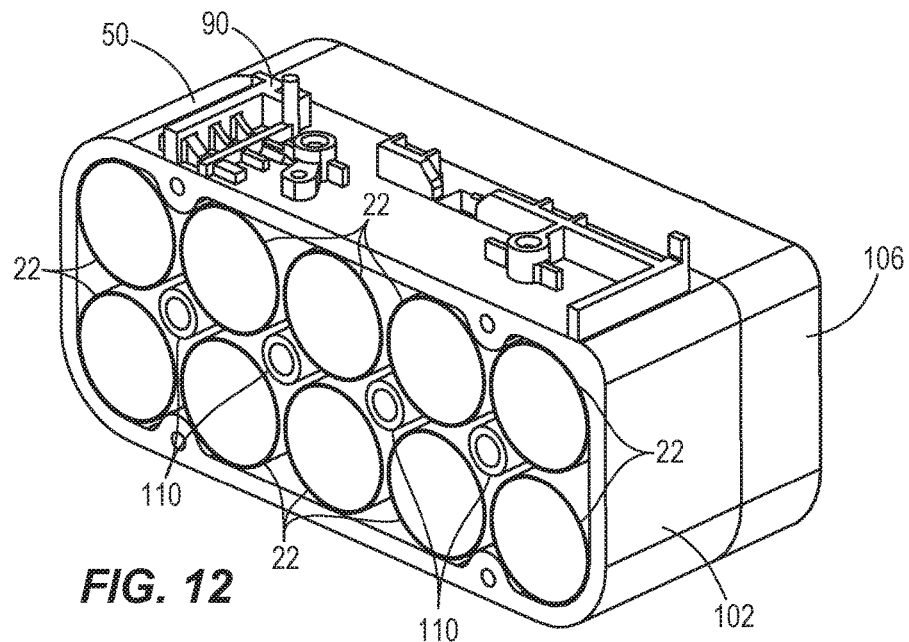
FIG. 12 is a cross-sectional view of the battery pack of FIG. 8, taken generally along line 12-12 in FIG. 8.
Figure 13:
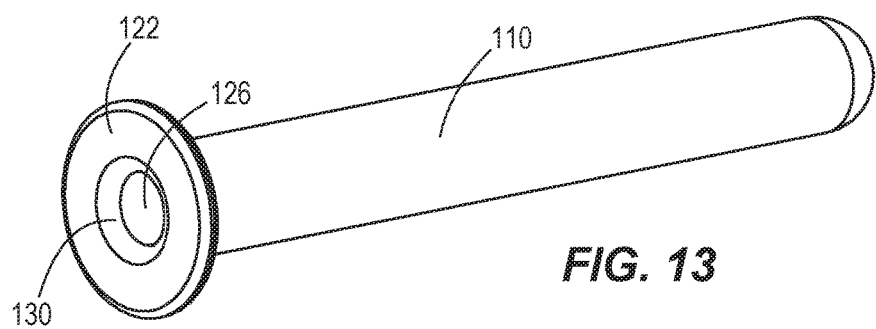
FIG. 13 is an isometric view of a bladder used in the battery pack of FIG. 8.
Figure 14:
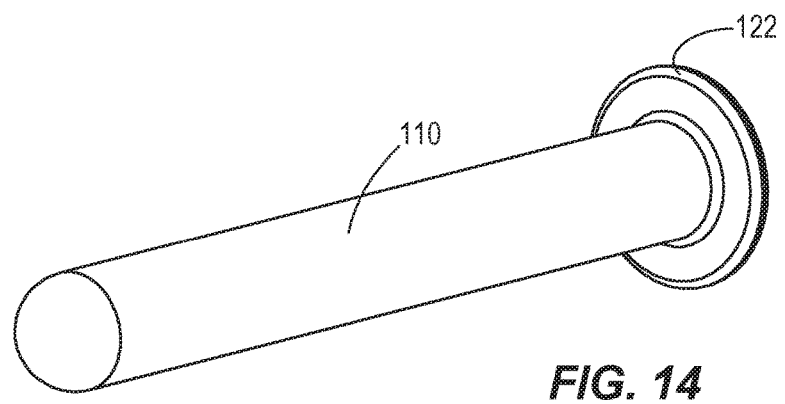
FIG. 14 is an isometric view of the bladder of FIG. 13 from the opposite side.
Figure 15:
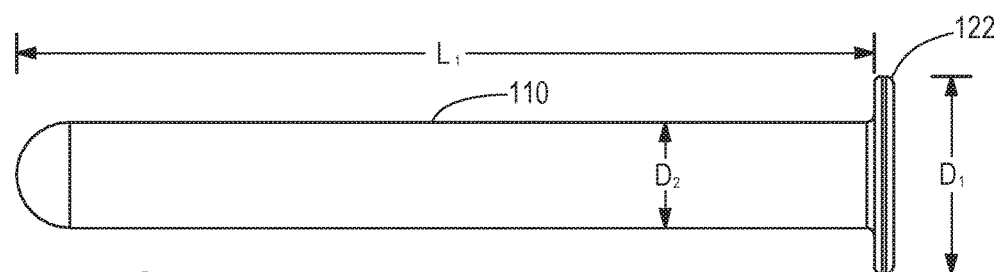
FIG. 15 is an elevation view of the bladder of FIG. 13.

As best shown in FIGS. 11-12, each bladder 110 is positioned within the cell support 50 between a plurality of battery cells 22. In the illustrated construction, the battery cells 22 are evenly spaced or distributed about and equidistant from the bladder 110. This positioning of the battery cells 22 about the bladder 110 allows heat generated by the battery cells 22 to evenly transfer to the phase change material 18 within the bladder 110, and the even transfer of heat facilitates a radial change in phase of the phase change material 18. For example, in constructions incorporating a paraffin wax in the phase change material 18, the paraffin wax increases in volume during the solid-liquid phase change, and the even transfer of heat from the battery cells 22 to the bladder 110 facilitates a radial expansion of the paraffin wax.

The equidistant, evenly spaced battery cells 22 can be any suitable distance from the bladder 110 as long as the battery cells 22 maintain the heat transfer relationship with the bladder 110 in all phases of the phase change material 18. While, in the illustrated construction, four battery cells 22 are positioned about each bladder 110, in other constructions (not shown), any suitable number of battery cells 22 can be positioned equidistant from each bladder 110. For example, more than or fewer than four battery cells 22 can be evenly distributed about a central bladder 110.

Figure 16:
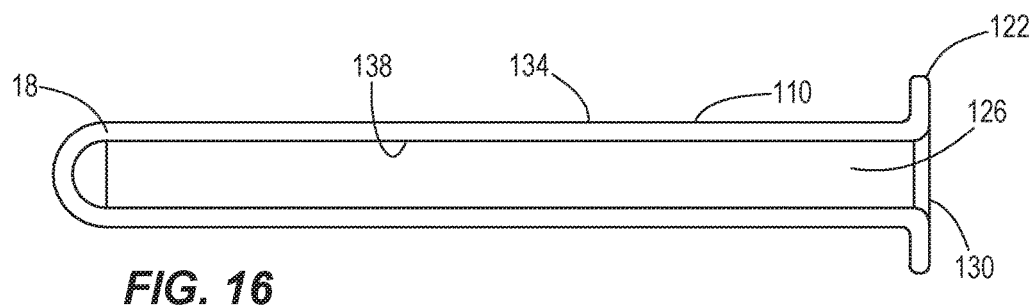
FIG. 16 is a cross-sectional view of the bladder of FIG. 15.

Referring now to FIGS. 13-16, the bladder 110 defines a channel 126 (shown in FIG. 16) extending from an opening 130 through the flange 122 (shown in FIGS. 13 and 16) into the body of the bladder 110. As best shown in FIG. 16, the bladder 110 also includes an outer wall or layer 134 separated from an inner wall or layer 138. The outer layer 134 defines an exterior boundary of the bladder 110, while the inner layer 138 defines a boundary of the channel 126 (or defines the channel 126). Phase change material 18 is positioned between the layers 134, 138, surrounding a portion of the channel 126. The layers 134, 138 are formed of an elastic or pliable or resilient material. The resilient material allows the bladder 110 to manage changes in volume of phase change material 18 during changes in phase.

More specifically, in conditions in which the phase change material 18 increases in volume during the change in phase, the inner layer 138 accounts for the volume expansion by deforming into the channel 126. As the inner layer 138 deforms, the channel 126 collapses, and, as the channel 126 collapses, air within the channel 126 is displaced from the channel 126 by venting though the opening 130. The air is thus vented out of the cell support 50, which may minimize or alleviate undesirable pressure in the cell support 50 (and the battery pack 14) (see FIG. 8).

For example, in constructions incorporating a paraffin wax in the phase change material 18, as the paraffin wax expands during the solid-liquid phase change, the inner layer 138 deforms and collapses the channel 126. As the channel 126 collapses, air within the channel 126 is displaced though the opening 130 and out of the cell support 50.

In conditions in which the phase change material 18 decreases in volume, the bladder 110 is constructed and arranged to maintain heat transfer relationship with the cells 22. For example, in a minimum volume condition, the outer layer 134 contacts the cells 22. In conditions above this minimum volume condition, increases in volume are accommodated as described above.

In the illustrated construction, the layers 134, 138 are formed of the same material and to have the same material characteristics. However, in other constructions (not shown), the layers 134, 138 can be formed of different materials and/or have a different construction (e.g., thickness, pre-stress, etc.) to provide different material characteristics. For example, the inner layer 138 may be formed of a material having a greater elasticity than a more rigid material used to form the outer layer 134. By using the more elastic material in the inner layer 138 than the outer layer 134, the inner layer 138 will deform in response to changes in volume caused by the changes in phase of phase change material 18, while the outer layer 134 will be less susceptible to deformation.

In one or more constructions of the battery pack 14 shown in FIG. 8, the openings 130 of the bladders 110 can be covered by a screen or other perforated member (not shown) permitting air flow into and out of the channel 126 while limiting dirt, debris, or other materials from entering the channel 126.

FIGS. 17-20 illustrate another construction of the battery pack 14 including phase change material 18 with the battery housing 26 and circuit 58 removed. In this construction, the battery pack 14 incorporates a system operable to, for example, contain phase change material, manage material volume during changes in phase, etc.

Figure 17:
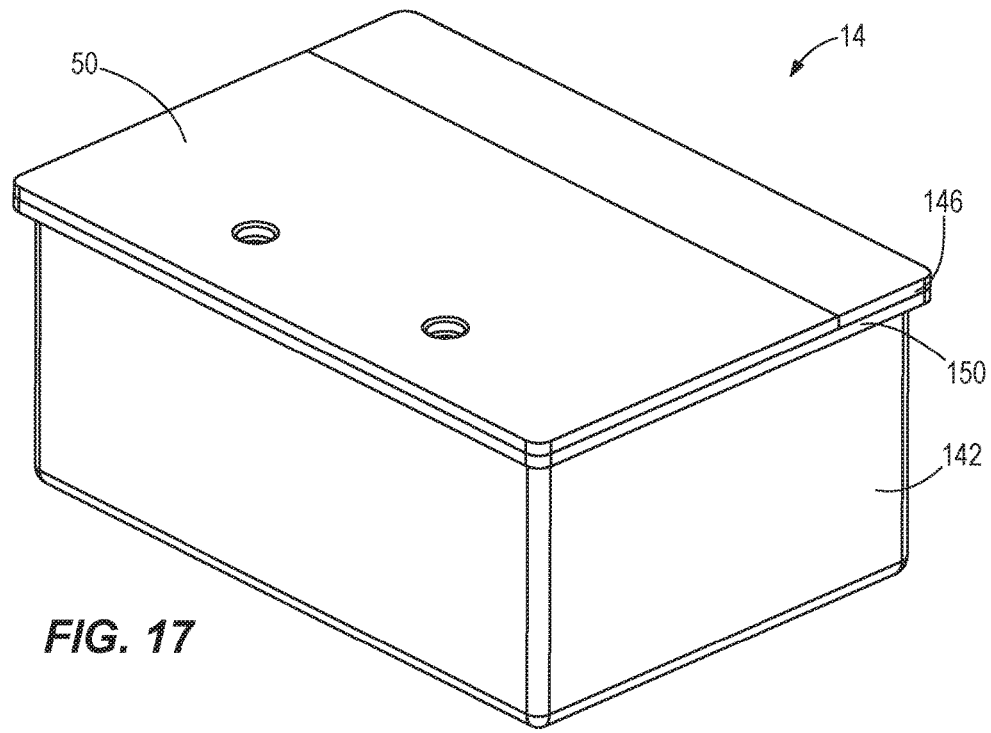
FIG. 17 is an isometric view of a construction of the battery pack of FIG. 1 with the battery housing and circuit removed to illustrate an alternative system for managing material volume of phase change material during changes in phase.

As shown in FIG. 17, the cell support 50 is received by a phase change housing 142. The cell support 50 includes a first lip 146 extending about its perimeter, and the phase change housing 142 includes a complementary second lip 150. The lips 146, 150 form a compression seal between the cell support 50 and the phase change housing 142.

Figure 18:
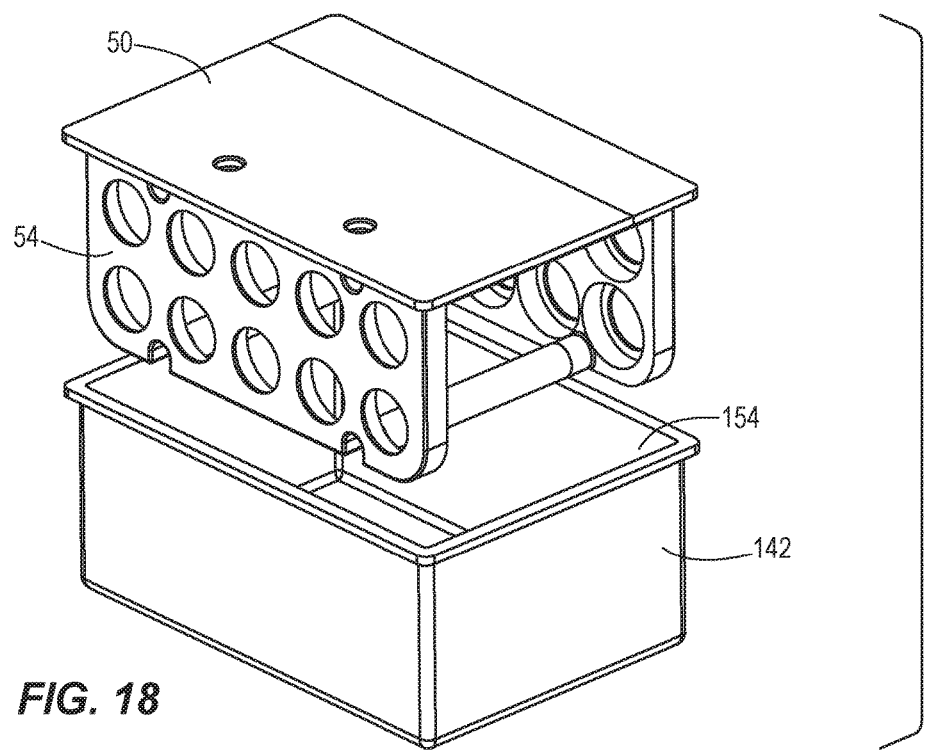
FIG. 18 is an exploded view of the battery pack of FIG. 17, with the cell support removed from a phase change housing.

Referring to FIG. 18, a bladder (not shown) containing phase change material 18 is positioned about an inside perimeter 154 of the phase change housing 142. The bladder is preferably a single bladder receiving the cell support 50 to substantially surround an exterior circumference of the cell support 50. The bladder is maintained in place by the compression seal formed by the lips 146, 150.

Figure 19:
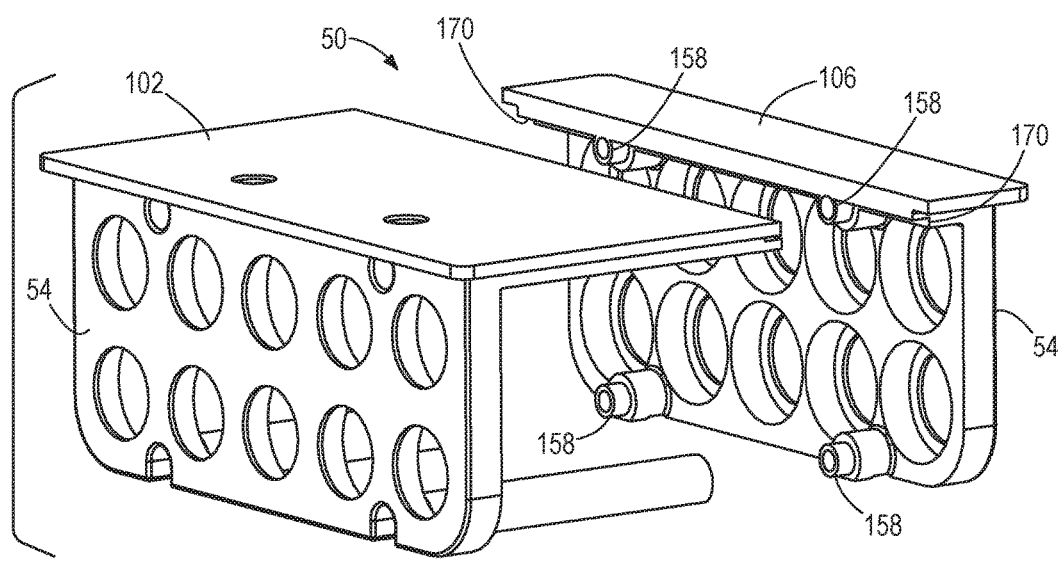
FIG. 19 is an isometric exploded view of a multi-piece cell support for use with the battery pack of FIG. 17.
Figure 20:
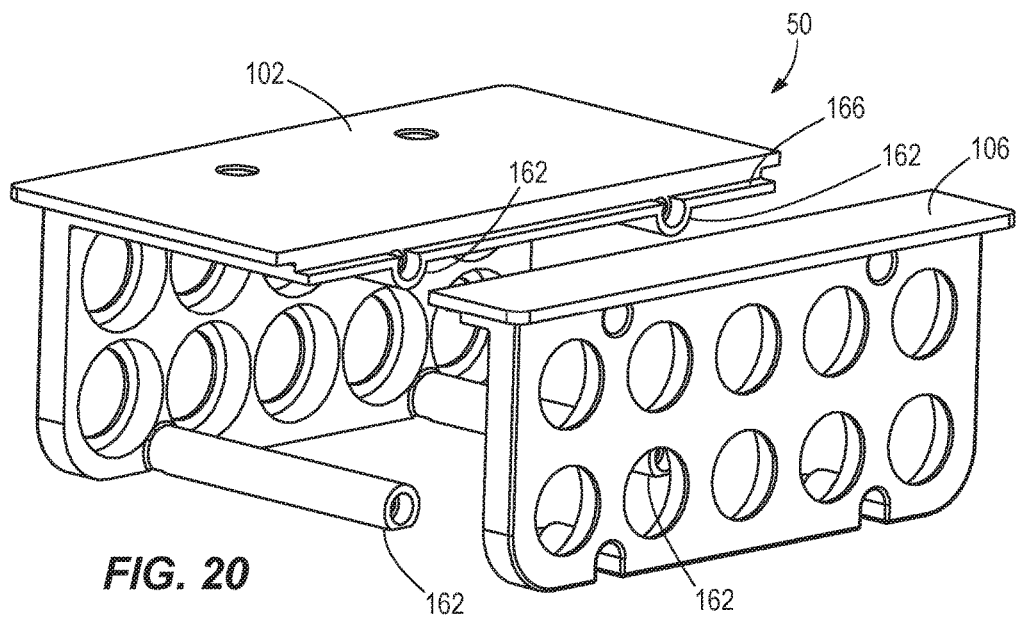
FIG. 20 is an isometric exploded view of the multi-piece cell support of FIG. 19 from the opposite side.

Now referring to FIGS. 19-20, the cell support 50 is defined by a first portion of a cell case 102 (having cell receptacles 54) and a second portion of a cell case 106 (having cell receptacles 54). The cell cases 102, 106 mate by a plurality of projections 158 received by corresponding apertures 162. To further facilitate mating, a projecting ledge 166 can be received by a corresponding recessed ledge 170.

Figure 21:
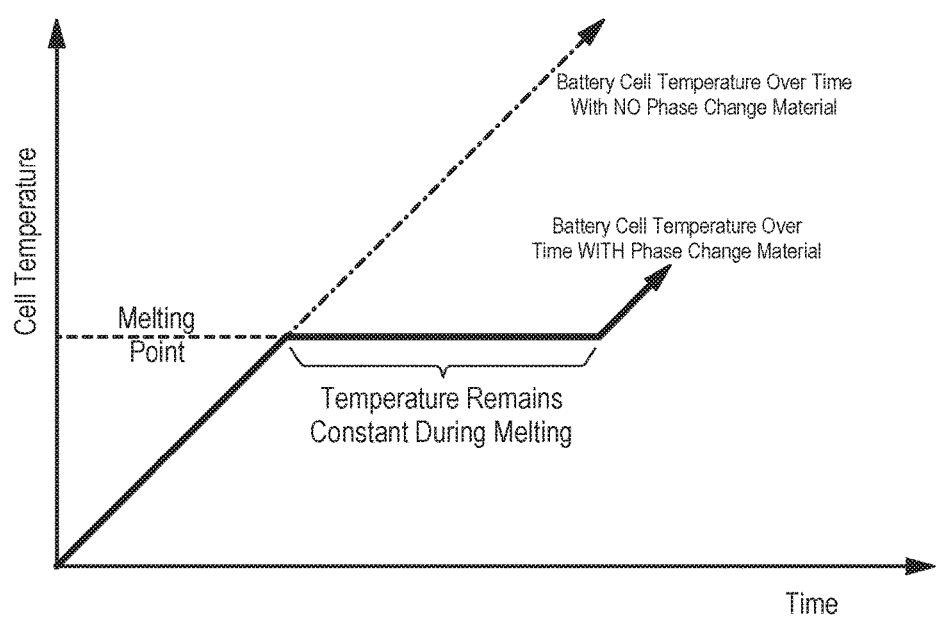
FIG. 21 is a graph of battery cell temperature (y-axis) versus time (x-axis) illustrating the temperature during discharge over time of a battery cell not having phase change material, and the temperature during discharge over time of the battery cell of FIG. 1 having phase change material.

FIG. 21 illustrates operation of the battery pack 14 having phase change material 18. The solid-liquid phase change material 18 is initially in its solid form. As the battery cells 22 generate heat, the phase change material 18 absorbs the heat. As the phase change material 18 absorbs heat, the temperature of the phase change material 18 increases.

The phase change material 18 continues to absorb heat and increase in temperature until reaching its melting temperature. Upon reaching melting temperature, the phase change material 18 changes phase from a solid to a liquid. During this transition to liquid phase, the phase change material 18 continues to absorb heat at an almost constant temperature, and the temperature of the battery cells 22 remains constant. The phase change material 18 continues to absorb heat until all phase change material 18 is transformed to the liquid phase. The phase change material 18 and the battery pack 14 are designed to completely transform the phase change material 18 to its liquid phase and maintain the temperature of the battery cells 22 below the predetermined threshold until the battery cells 22 are substantially discharged (until end of discharge).

Generally, the phase change material 18 remains in its liquid phase and stores heat until the ambient temperature around the phase change material 18 begins to decrease or the heat is transferred away from the phase change material 18, for example, through the heat sink 86. As the temperature decreases, the phase change material 18 solidifies. While solidifying, the phase change material 18 releases stored heat.

The temperature regulation system with the phase change material 18 may delay high temperature conditions which trigger disabling of the battery pack 14, at least until the battery cells 22 are substantially discharged (end of discharge). This may lengthen the operational life of battery cells 22 by minimizing exposure to high temperature conditions and potential damage to or degradation of the cells 22. This may also allow the battery pack 14 to provide power to the electrical device until end of discharge, rather than being disabled due to high temperature conditions prior to end of discharge, especially during long duration and high current draw applications. This may also allow the battery pack 14 to supply current to higher loads and/or for longer durations.

In some constructions, the phase change material 18 may also provide contamination protection for the battery cells 22 and associated internal components. For example, by at least partially encapsulating the cells 22, components, etc., the phase change material 18 reduces the likelihood of ingress by water, other debris, or contaminants that may damage components of the battery pack 14. The phase change material 18 is also electrically insulating, which may reduce the risk of short circuiting between the battery cells 22.

In constructions in which, the phase change material 18 is arranged to encapsulate the cells 22 and cell receptacles 54, it does so without obstructing or interfering with a cell pressure release assembly (e.g., on an end of each cell 22) which provides for a controlled depressurization of the battery cells 22 in the event of high-temperature conditions that would lead to failure of the battery cells 22 or the battery pack 14 (e.g. an explosion, etc.). For example, because the illustrated phase change material 18 decreases in volume during the solid-liquid phase change and because the pressure release assembly would not be triggered until after the phase change material 18 is entirely in liquid phase, the assembly, if needed, would be unobstructed by the phase change material 18. Thus, the phase change material 18 can encapsulate the portion of the battery cell 22 (e.g., an end) including the pressure release assembly.

The phase change material 18, in either phase, may further provide shock resistance for the battery pack 14, protecting internal components. Some battery packs incorporate shock absorbers, and use of the phase change material 18 may lead to a reduction in size or elimination of the shock absorber(s). The phase change material 18 may also provide strength to the battery pack 14 and reduce the likelihood of fatigue damage/failure of components of the battery pack 14.

The phase change material 18 may also provide temperature maintenance, enabling charging in low temperature environments. Some battery packs may be prevented from being charged in low temperatures to prevent damage to the battery cells. The phase change material 18 may maintain the temperature of the battery cells 22 above a low temperature threshold below which the cells 22 will not be charged. This allows for battery cell 22 charging in a greater range of low temperature environments.

One or more independent advantages or independent features of the invention may be set forth in the claims.

What is claimed is:

1. A bladder configured to support phase change material in a heat transfer relationship with at least one battery cell, the bladder comprising:
    a wall defining a channel, the phase change material surrounding a portion of the channel.

2. The bladder of claim 1, wherein the wall defines an opening fluidly connected to the channel.

3. The bladder of claim 2, further comprising a flange, the opening being defined in the flange.

4. The bladder of claim 2, wherein, in response to a change in phase of the phase change material, the wall is configured to collapse the channel.

5. The bladder of claim 4, wherein, in response to the channel collapsing, a fluid in the channel is configured to be displaced through the opening.

6. The bladder of claim 5, wherein the fluid includes air.

7. The bladder of claim 1, wherein the wall is an inner wall, and wherein the bladder further comprises an outer wall spaced from the inner wall.

8. The bladder of claim 7, wherein the phase change material is positioned between the outer wall and the inner wall.

9. The bladder of claim 7, wherein, in response to a change in phase of the phase change material, the inner wall is configured to collapse the channel.

10. The bladder of claim 9, wherein the inner wall is formed of an elastic material.

11. The bladder of claim 9, wherein the inner wall defines an opening fluidly connected to the channel, and wherein, in response to the channel collapsing, a fluid in the channel is configured to be displaced through the opening.

12. The bladder of claim 11, wherein the fluid includes air.

13. The bladder of claim 1, further comprising a vent in fluid communication with the channel, and wherein, in response to a change in phase of the phase change material, a fluid in the channel is configured to be displaced through the vent.

14. The bladder of claim 1, wherein, in response to a change in phase of the phase change material, the channel is configured to change in volume.

15. A vessel containing phase change material, the phase change material in a heat transfer relationship with at least one battery cell, the vessel comprising:
    an outer wall;
    an inner wall defining a channel; and
    a vent in fluid communication with the channel, the phase change material being positioned between the outer wall and the inner wall.

16. The vessel of claim 15, wherein the phase change material surrounds a portion of the channel.

17. The vessel of claim 15, wherein, in response to a change in phase of the phase change material, the inner wall is configured to collapse the channel.

18. The vessel of claim 15, wherein, in response to a change in phase of the phase change material, a fluid in the channel is configured to pass through the vent.

19. The vessel of claim 18, wherein the fluid includes air.

20. The vessel of claim 15, further comprising a flange, the vent being positioned through the flange.

* * * * *